US009590352B2

(12) United States Patent

Bilbrey et al.

(10) Patent No.: US 9,590,352 B2

(45) Date of Patent: Mar. 7, 2017

(54) MAGNETICALLY-IMPLEMENTED SECURITY DEVICES

(75) Inventors: Brett Bilbrey, Sunnyvale, CA (US); Aleksandar Pance, Saratoga, CA (US); Peter Arnold, Cupertino, CA (US); David I. Simon, San Francisco, CA (US); Jean Lee, San Jose, CA (US); Michael D Hillman, Los Altos, CA (US); Gregory L. Tice, Los Altos, CA (US); Vijay Iyer, Mountain View, CA (US); Bradley Spare, San Jose, CA (US)

(73) Assignee: Apple Inc., Cupertino, CA (US)

( * ) Notice: Subject to any disclaimer, the term of this patent is extended or adjusted under 35 U.S.C. 154(b) by 948 days.

(21) Appl. No.: 13/188,429

(22) Filed: Jul. 21, 2011

(65) Prior Publication Data

US 2012/0023597 A1 Jan. 26, 2012

Related U.S. Application Data

(60) Provisional application No. 61/366,466, filed on Jul. 21, 2010.

(51) Int. Cl.

*H04L 29/06* (2006.01)
*H01R 13/62* (2006.01)
*H01R 13/641* (2006.01)

(52) U.S. Cl.

CPC ....... *H01R 13/6205* (2013.01); *H01R 13/641* (2013.01)

(58) Field of Classification Search

None

See application file for complete search history.

(56) References Cited

U.S. PATENT DOCUMENTS

| | | | |
|---|---|---|---|
| 5,812,356 A | 9/1998 | O'Connor | |
| 5,921,783 A | 7/1999 | Fritsch et al. | |
| 6,561,815 B1 | 5/2003 | Schmidt | |
| 7,066,785 B2 | 6/2006 | Park et al. | |
| 7,817,003 B2 | 10/2010 | Fullerton et al. | |
| 7,834,729 B2 | 11/2010 | Fullerton et al. | |
| 7,868,721 B2 | 1/2011 | Fullerton et al. | |
| 8,018,105 B2 | 9/2011 | Erixon et al. | |
| 8,177,560 B2 | 5/2012 | Rohrbach et al. | |
| 2006/0151990 A1* | 7/2006 | Cowburn | 283/82 |
| 2009/0128503 A1 | 5/2009 | Grant et al. | |
| 2009/0278642 A1* | 11/2009 | Fullerton et al. | 335/284 |
| 2010/0302199 A1 | 12/2010 | Taylor et al. | |
| 2012/0021619 A1 | 1/2012 | Bilbrey et al. | |

(Continued)

FOREIGN PATENT DOCUMENTS

| | | |
|---|---|---|
| FR | 2944613 | 10/2010 |
| KR | 20100138219 | 12/2010 |

*Primary Examiner* — Joseph P Hirl

*Assistant Examiner* — Leynna Truvan

(57) ABSTRACT

Security devices and methods of securely coupling electronic devices and peripherals are provided. In one embodiment, a peripheral has a first coded magnet on a first surface of a first device. The first coded magnet has at least two different polarity regions on the first surface. A second coded magnet on a second surface of a second device is also provided. The first coded magnet is configured to securely provide data to a device associated with the second coded magnet, if the first and second coded magnets' patterns are keyed to one another.

21 Claims, 11 Drawing Sheets

100

(56) References Cited

U.S. PATENT DOCUMENTS

| | | | |
|---|---|---|---|
| 2012/0023597 A1 | 1/2012 | Bilbrey et al. | |
| 2012/0028480 A1 | 2/2012 | Bilbrey et al. | |
| 2012/0031153 A1* | 2/2012 | Conti | 70/14 |
| 2012/0032765 A1 | 2/2012 | Bilbrey et al. | |
| 2012/0155803 A1 | 6/2012 | Benjamin et al. | |
| 2012/0163754 A1 | 6/2012 | Benjamin et al. | |
| 2013/0076652 A1 | 3/2013 | Leung | |

* cited by examiner

MAGNETICALLY-IMPLEMENTED SECURITY DEVICES

CROSS-REFERENCE TO RELATED APPLICATIONS

This application claims the benefit under 35 U.S.C. §119(e) of U.S. Provisional Patent Application No. 61/366,466, filed Jul. 21, 2010 and titled, "Applications of Programmable Magnets," the disclosure of which is hereby incorporated herein in its entirety. This application is also related to U.S. patent application Ser. No. 13/188,428, titled "Alignment and Connection for Devices," U.S. patent application Ser. No. 13/188,432, titled "Magnetic Fasteners" and U.S. patent application Ser. No. 13/188,436, titled "Programmable Magnetic Connectors," all filed on the same day as this application and all of whose disclosures are hereby incorporated herein in their entireties.

TECHNICAL FIELD

Embodiments discussed herein relate generally to programmable magnetic devices, and more particularly to security for computing devices and peripherals that may be provided by programmable magnets.

BACKGROUND

Electronic devices are common in both home and work environments. Such devices often transmit data back and forth in order to operate or share information. In many cases, data transmission is unsecured or conventionally secured by methods that are easy to defeat. Physical security of certain items, such as computing devices, also may be desirable.

Magnetic structures may aid in securing physical access. For example, magnetic doors may prevent ingress by unauthorized persons. However, magnetic security is rarely applied to securing data or functionality of an electronic device. Likewise, magnetic security is rarely used to authenticate data transmissions. Further, most magnetically-implemented security is very basic. In the door example, above, a door may be magnetically sealed but access is rarely granted through the application of magnetic principles. Rather, magnetism is used to provide the actual physical security by keeping the door closed.

What is described herein are apparatuses, methods and systems for implementing various types of security through the use of correlated magnetic structures.

SUMMARY

Embodiments disclosed herein generally take the form of various magnetically-implemented security devices.

One embodiment may take the form of a magnetically-implemented security device, comprising: a first correlated magnet formed on a first structure, the first correlated magnet comprising at least two unique magnetic surfaces; and a second correlated magnet formed on a second structure; the second correlated magnet authenticating the second structure with the first structure.

Another embodiment takes the form of a method for securely accessing functionality of an electronic device, comprising: magnetically coupling a key to a magnetic surface of an interior element of the electronic device, the magnetic surface comprising a plurality of sub-regions, each of the plurality of sub-regions having its own magnetic characteristics; moving the key; in response to moving the key, magnetically manipulating the interior element; and, in response to magnetically manipulating the interior element, accessing the functionality.

Still another embodiment takes the form of an apparatus for securely transmitting data to a computing device, comprising: a data receiver operable to receive data from a peripheral; a data transmitter operably connected to the data receiver and operable to transmit the data to the computing device; a magnetic structure associated with the data receiver, the magnetic structure operable to prevent the data receiver from receiving data unless the peripheral has a complementary magnetic structure.

DETAILED DESCRIPTION

Connectors and methods of coupling electronic devices and cables are provided. In one embodiment a cable is provided having a coupler with dynamic pins. The coupler may have a magnetic code used to identify the connector and the pins may be controlled to extend a distance to provide a desired coupling. Thus, a single connector may be used for multiple different devices.

In some embodiments, the pins may be recessed within the connector so that the connector presents a smooth outer surface. The pins may be extended outwardly magnetically when approaching the port. This may help prevent the pins from being damaged when not coupled. Additionally, in some embodiments, the orientation of the connector may be adjusted to comply with the orientation of its mate. This may allow for a universally adaptable connector.

In one embodiment, a port or other connectors may be completely sealed, thus allowing for a device housing to be hermetically sealed. Correlated magnets may be used to properly orient/position the connectors and communications may be conducted wirelessly (e.g., via light, radio frequency, and so forth).

"Correlated magnets" or "coded magnets" are magnetic structures formed of multiple individual magnetic elements, each of which has both a north and a south pole. The individual magnetic elements may vary in terms of which pole faces a surface of a coded magnet. Thus, a single coded magnet may have multiple magnetic poles on a single surface, and these multiple magnetic poles may cooperate to form a pattern of north and south poles.

Figure 1:
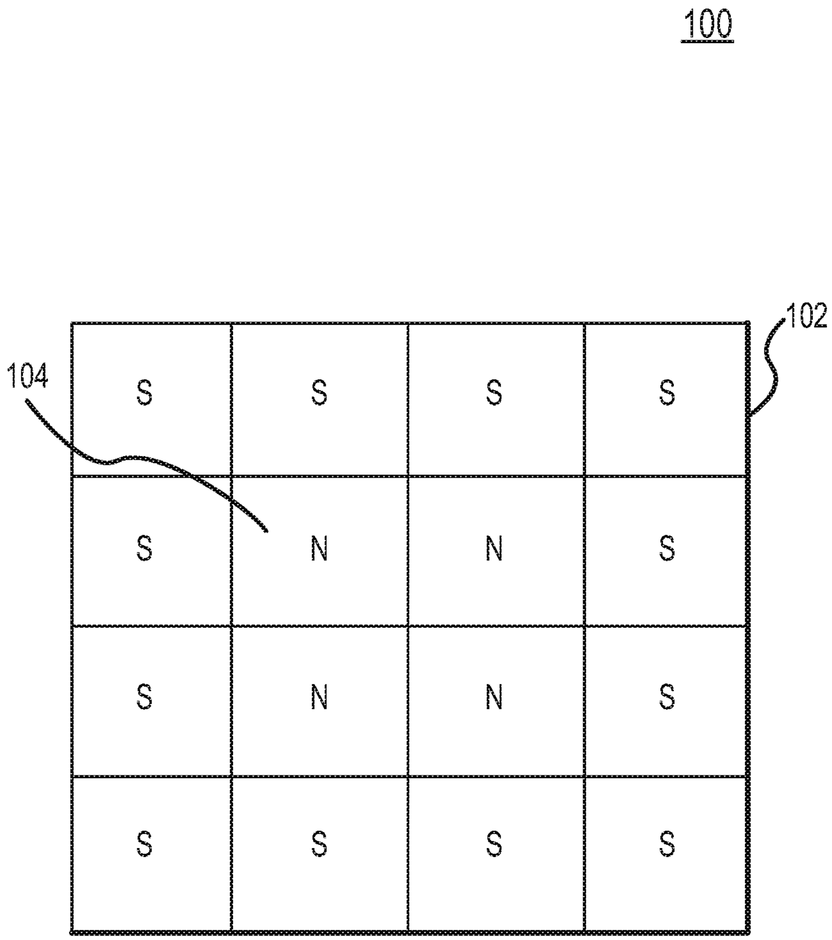
FIG. 1 depicts a coded magnetic structure made from a four-by-four grid of maxels.

FIG. 1 shows an example coded magnet 100 having a four-by-four grid, with each portion of the grid being occupied by a separate magnetic element. The outer portion 102 of the coded magnet 100 may include magnetic elements having their south poles facing in a common direction, such as toward the viewer with respect to FIG. 1. The center two-by-two portion 104 of the coded magnet 100 may contain magnetic elements with their north poles facing toward the viewer with respect to FIG. 1. In this example, the magnetic elements of the coded magnet 100 include 12 magnets presenting their south poles (e.g., negative polarities) toward an exposed surface ringing four magnets presenting their north poles (e.g., positive polarities) toward the same exposed surface. The constituent magnetic elements may be referred to herein as “maxels.”

It should be appreciated that the overall magnetic field of the coded magnet 100 will depend on the arrangement of the constituent magnetic elements. Certain correlated magnets may exert a repulsive force at a first distance against an external magnetic or ferrous surface, but an attractive force at a second distance. The exact distances at which a coded magnet may be magnetically attractive or repulsive generally depend on the arrangement and strength of each individual maxel. By properly positioning maxels on a coded magnet surface, a force curve having particular attractive and repulsive strengths at certain distances may be created. It should likewise be noted that the force curve may switch between attraction and repulsion more than once as the separation distance between the coded magnet and magnetic surface increases or decreases.

Generally, the coding of a correlated magnetic surface (e.g., the placement of maxels having particular field strengths and polarities) creates a particular two-dimensional pattern on the surface and thus a three-dimensional magnetic field. The three-dimensional magnetic field may serve to define the aforementioned force curve, presuming that the external magnetic or ferrous surface has a uniform magnetic field.

Further, the two-dimensional pattern of the coded magnetic surface generally has a complement or mirror. This complement is the reversed maxel pattern of the coded magnetic surface. Thus, a complementary coded magnetic surface may be defined and created for any single coded magnetic surface. A coded magnetic surface and its complement are generally attractive across any reasonable distance, although as the separation distance increases the attraction attenuates. With respect to a uniform external magnetic or ferrous surface, the force curve of a complementary coded magnet is the inverse of the original coded magnet’s force curve. The force curve between two coded magnets may be varied by misaligning pairs of magnets, magnet strengths and the like, yielding the ability to create highly variable, and thus tailorable, force curves.

Since the maxel pattern of a coded magnet varies in two dimensions, rotational realignment of an external magnetic surface (including a complementary coded magnet) may relatively easily disengage the coded magnet from the external magnetic surface. The exact force required to rotationally disengage two coded magnets, or a coded magnet and a uniformly charged external surface, may be much less than the force required to pull the two apart. This is because rotational misalignment likewise misaligns the maxels, thereby changing the overall magnetic interaction between the two magnets.

Further, it should be appreciated that coded magnets may be programmed or reprogrammed dynamically by using one or more electromagnetic maxels to form the coded surface pattern. As current is applied to the electromagnetic maxels, they will produce a magnetic field. When no voltage is applied, these maxels would be magnetically inert. When the input current is reversed, the polarity of the maxels likewise reverses. Thus, the coding of the coded magnet 100 may be changed through application of electricity. Further, any single electromagnetic maxel yields many possible codings presuming all other maxels remain constant: a first coding for the coded magnetic surface when the electromagnetic maxel is attractive, a second when the current is reversed and the electromagnetic maxel is repulsive, and a third when no current is applied and the electromagnetic maxel is neutral. By varying the position of the maxel on the coded magnet 100 and/or the current supplied to the maxel, even more variations may be obtained. Given a coded magnet having a five-by-five maxel array (for example), the number of possible codings if all maxels are electromagnets, held in a fixed position and supplied with a fixed current is $3^{25}$, or 847,288,609,443 possible codes at any given moment. Since the coding of the surface may be adjusted dynamically, certain embodiments discussed herein may change their magnetic fields on the fly and thus their force curves. Specific implementations of this concept are discussed herein, although those of ordinary skill in the art will appreciate that variations and alternate embodiments will be apparent upon reading this disclosure in its entirety.

Given the foregoing discussion of coded magnets, it should be appreciated that such magnetic surfaces may be incorporated into a variety of devices, apparatuses, applications and so on to create or enhance functionality of one sort or another. Certain embodiments using coded magnets and the function of these embodiments will now be discussed.

Cables

Certain embodiments may take the form of cables incorporating coded magnets. Cables may have coded magnets at one or both ends and/or along one or more portions of the cable body. In the event the coded magnets are situated along the body, they may be laid out in strips, spirals, helixes, geometric shapes and so on. Likewise, coded magnets located at one or both ends of the cable may be arranged in a variety of shapes and patterns. The shapes and/or patterns of the coded magnets on the cable may be chosen to create a specific attractive/repulsive force curve.

As one example, many computers and devices made by Apple Inc. employ MAGSAFE connectors at the ends of cables. The MAGSAFE connector magnetically couples the cable to the appropriate device port in the appropriate position and/or configuration, but will decouple when sufficient force is exerted on the cable or device in order to avoid accidentally jerking or moving the device.

By using a coded magnet for the MAGSAFE connector cord (or in place thereof) and a complementary coded magnet within the device port, the union between the connector and device port may be made more secure. Further, by using a properly coded maxel arrangement for both coded magnets, the device port may actually attract or “suck in” the MAGSAFE connector from a distance. Further, the device port may repel a connector/cord that has a differently-coded coded magnetic surface.

In addition, cables and cords described herein may have coded magnets that permit easy disengagement from a port.

The cable's coded magnet may have a force curve that reduces the attractive force significantly, or even creates a repulsive force, when it rotates with respect to a coded magnet within the port. In this manner, the cable may disengage rather than pull an attached device off a table when the cord is sharply tugged or yanked.

Similarly, each port of a device may incorporate a coded magnet having a different maxel pattern. Cords configured to mate with a particular port may have a complementary or attractive maxel pattern, such that the cords may mate with that port but be repulsed by other ports. Further, certain cords may be designed to mate with multiple ports and may have a maxel pattern that, at least at certain distances (such as a relatively close distance), is attracted by the coded magnet of each such port.

Still other embodiments may take the form of a programmable cable. That is, the cable may detect the flux and/or polarity of each individual maxel in a coded magnet of a port, or may detect an overall flux, strength or the like for the coded magnet as a whole.

In one embodiment, the cable may perform this detection by rapidly switching the maxel patterns of its own coded magnet until they complement the pattern of the port's coded magnet. The cable's coded magnet pattern may be dynamically switched by using electromagnetic maxels, which are capable of switching their polarity as a current is applied.

As another example of an embodiment, certain cords may have coded magnets at, in or proximate one end that permit them to detect an appropriately configured coded magnet in a nearby port of a device. Presuming the force curve is sufficiently attractive, the coded magnet in the cable may "home in" on the coded magnet in the port, physically moving the cable toward the port. In certain cases, the attraction is sufficient to dock or mate the cable to the port. Presuming that each cable is magnetically coded to be so attracted only to the port with which it is designed to interface, a cable may "home in" only on the proper port and ignore the others, thereby ensuring each cable is properly connected to a device.

Figure 2:
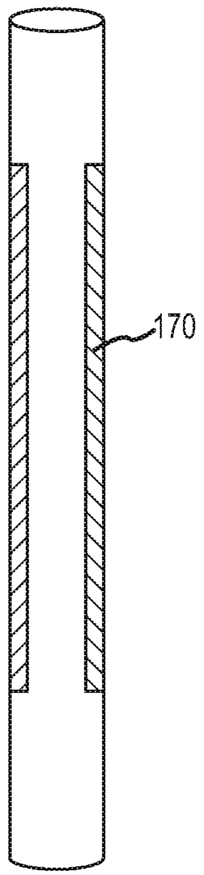
FIG. 2 depicts a cord having coded magnetic structures formed thereon in accordance with an embodiment.

Cables or cords incorporating coded magnetic surfaces may be used to organize, wind, and/or unwind themselves. Consider a group of cords 174 as in FIG. 3, each having a coded magnetic surface 170 in a strip, ring, spiral or other pattern about their exterior as shown in FIG. 2. The cables may be provided with a first coded magnetic structure on a first pattern and a second coded magnetic structure on a second pattern. The two coded magnetic structures may attract one another. By placing the patterns appropriately (for example, on opposing sides of a cord or sufficiently near each other that the cord cannot bend to touch the patterns together), attraction of the cord to itself may be avoided.

Figure 3:
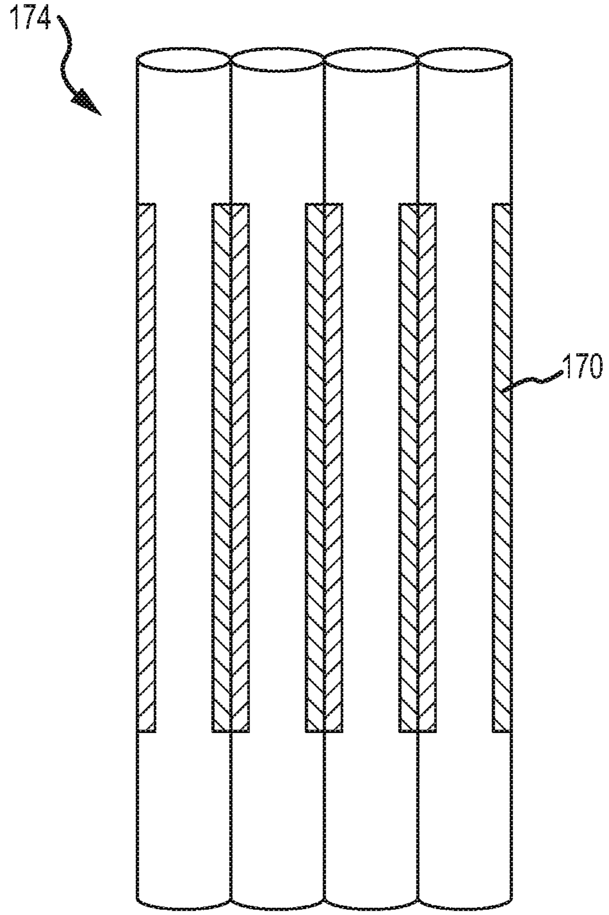
FIG. 3 depicts multiple cords having coded magnetic structures, magnetically locked to one another to form a strip.

However, other cords having the same coded magnetic structures may be attracted to one another. Given proper placement of the patterns on the cords, the cords may join together to form a bundle or strip as shown in FIG. 3. This, in turn, reduces clutter as well as the likelihood that the cords knot or kink around one another. Cords may be rotated or slid to disengage from one another. In certain embodiments, the magnetic coding of each pattern may be such that rotating, sliding and/or otherwise moving one cord with respect to another may cause the cords to repulse one another instead of attract.

In some embodiments, the coded magnetic structures may employ electromagnetic maxels. Thus, in a default unpowered state, the coded structures exert no magnetic field at all. When a current is provided to the maxels, the coded structures become magnetically active and may attract nearby cords, ports and the like as described above. In this manner, the interaction of the cord may be selectively controlled.

It should be appreciated that variants on the above may be used to implement a self-winding or self-coiling cord or cable. For example, a first coded magnet may be provided at a first end or on a first surface of a cable, a second coded magnet at a second end or second surface, and so on. The first and second coded magnets may attract one another and may be complementary in certain embodiments, as may other pairs of coded magnets on the cable surface. When the coded magnets are electromagnetically switched from a default state, they may attract the corresponding coded magnet (e.g., first to second coded magnet and the like) in order to wind, coil or otherwise structure the cable. The cable may remain magnetically locked in this configuration until the coded magnets are again electromagnetically switched, at which point they may be inert or even repel one another. Alternately, mechanically shifting the positions of the coded magnets with respect to one another may cause them to disengage as previously described. It should be noted that the "default" state of the coded magnets described herein may be a state either where current is or is not applied to the individual maxels.

Input Devices

Figure 4:
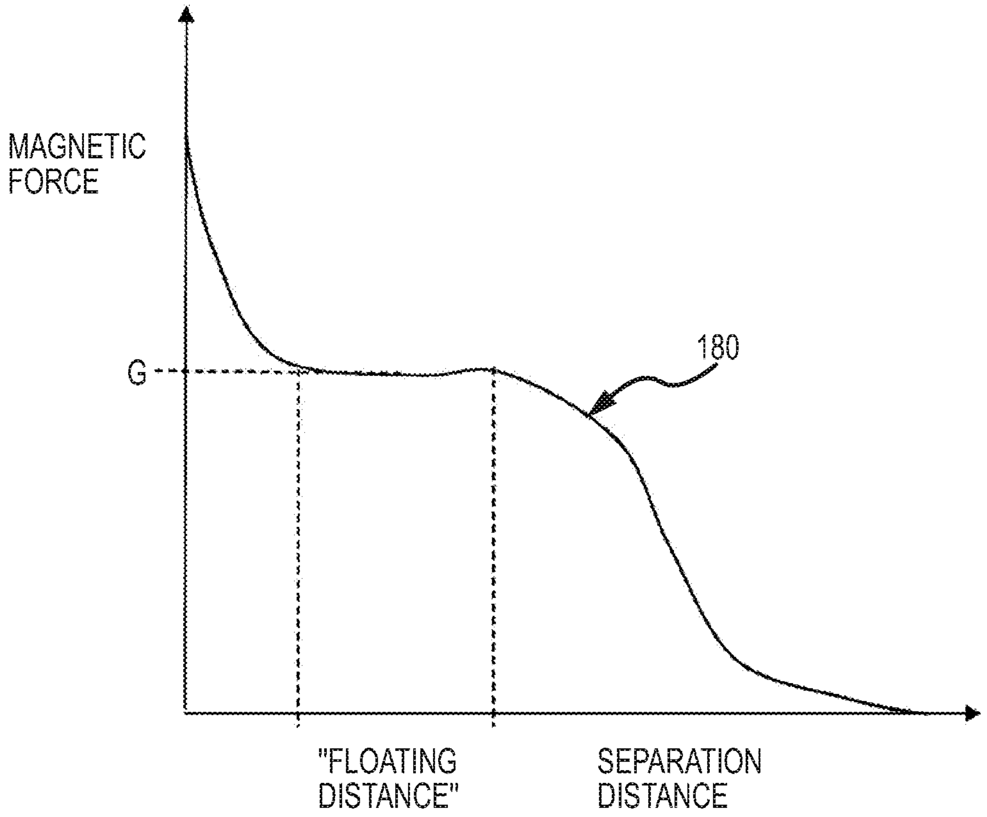
FIG. 4 depicts a sample force curve of a coded magnetic structure used to stably levitate a keycap, in accordance with another embodiment.

A variety of different input devices may be enhanced through the use of coded magnetic surfaces. For example, individual keys of a keyboard may be backed with a coded magnetic structure. Likewise, the surface of the keyboard below each key may have a coded magnetic structure formed thereon that, in conjunction with the coded magnet of the keycap, provides a particular force curve 180 as illustrated in FIG. 4. In alternative embodiments, only one of the keycap and keyboard may utilize a coded magnet while the other is a planar magnet or ferrous material.

At certain points along the force curve of FIG. 4, the magnetic repulsive force will equal the force of gravity G acting on a keycap. That is, at some separation distance between the keycap and keyboard, the repulsive magnetic force will balance out the force of gravity on the keycap. This is shown by the dashed line labeled "G" on FIG. 4. For the range of distances over which the magnetic repulsive force equals G, the keycap will essentially float above the keyboard surface. Properly coded magnetic structures should be sufficient to establish a range of distances over which the magnetic and gravity forces are equal, rather than a single distance. This range of equilibrium distances is labeled "floating distance range" on the graph. If the separation distance between the keycap and keyboard increases, the force due to gravity G overwhelms the magnetic force and the key drops back to the equilibrium distance. Conversely, if a user presses down on the keycap, the magnetic force increases.

This increase in magnetic force, if sufficiently sharp, may be perceived by a user as resistance. The force curve 180 of FIG. 4 can be tailored by properly coding the maxels of the correlated magnetic surface to provide any "feel" desired when the keycap is pressed. For example, if the magnetic repulsive force curve ramps up slowly as separation distance decreases, the floating keycap would feel soft when pressed. Conversely, if the force curve ramps up steeply, the keycap may feel firm. In this manner, the exact haptic feedback experienced by a user interacting with a so-called "floating keycap" may vary in accordance with a designer's or engineer's wishes. In some embodiments, the repulsive force will become sufficiently strong that it resists any casual press or impact on the keyboard at a certain separation distance.

When the keycap is released, it will settle back within the floating distance range as the magnetic force repulses the keycap.

A magnetic sensor on the keyboard may detect the increased magnetic flux caused by the keycap approaching the keyboard surface. If the magnetic flux (e.g., magnetic field strength) exceeds a certain threshold, then the keyboard may accept the keycap motion as an input. In this manner, the keyboard may function as normal but be provided with magnetically levitated keys.

It should be appreciated that the foregoing principles may be applied to mice, trackballs, and other input mechanisms as well. Similarly, a magnetic scroll wheel may be incorporated into a mouse such that a sensor measures changes in a magnetic field as the wheel rotates. The scroll wheel may be provided with a ring-shaped coded magnet to facilitate detection of a changing magnetic field; this detection may be used as an input to a corresponding device to indicate the motion of the wheel. Further, since the mouse wheel is magnetically sensed, the mechanical and optical influence of dirt or debrisin or near the wheel is irrelevant, presuming the dirt or debris is not metallic or magnetic in nature. Unlike an optical or mechanical sensor that may get jammed with dirt or dust and thus not detect the wheel's motion, dirt/dust has no mechanical or optical effect on sensing changes in a magnetic field caused by rotating a wheel having a properly coded magnetic surface thereon.

In addition, the levitating properties of properly configured correlated magnetic surfaces may be used to align electronic devices with respect to inductive chargers. By adjusting not only a separation distance (e.g., z-axis) but also moving the electronic device toward the optimal inductive charging position within a plane, enhanced charging may be achieved. Correlated magnetic surfaces may be used to rotate and/or laterally move the electronic device relatively easily once it is suspended in midair in the fashion described herein. A series of correlated magnets may cooperate to define a "wall" of repulsive force to hem the device within a particular area, or guide it to the area. Similar techniques may be used to lock a device to a dock for charging, or to align a device with a dock for optical data transmission (for example, in the case of an optical dock).

In a similar fashion, a mouse or other chargeable device may be pushed and/or pulled back to its docking station through the application of coded magnetic surfaces. These coded magnetic surfaces may only activate when the mouse battery falls below a certain level, or when the mouse does not move for a certain time. Battery charge may be monitored by the mouse and relayed to a microprocessor operative to supply voltage to the surfaces' electromagnetic maxels, thus initiating the motion of the mouse towards its charger. Similarly, an associated computing device may determine when the mouse is stationary for a threshold time and activate the electromagnetic maxels once that time is exceeded to push/pull the mouse to the charging station.

Figure 5:
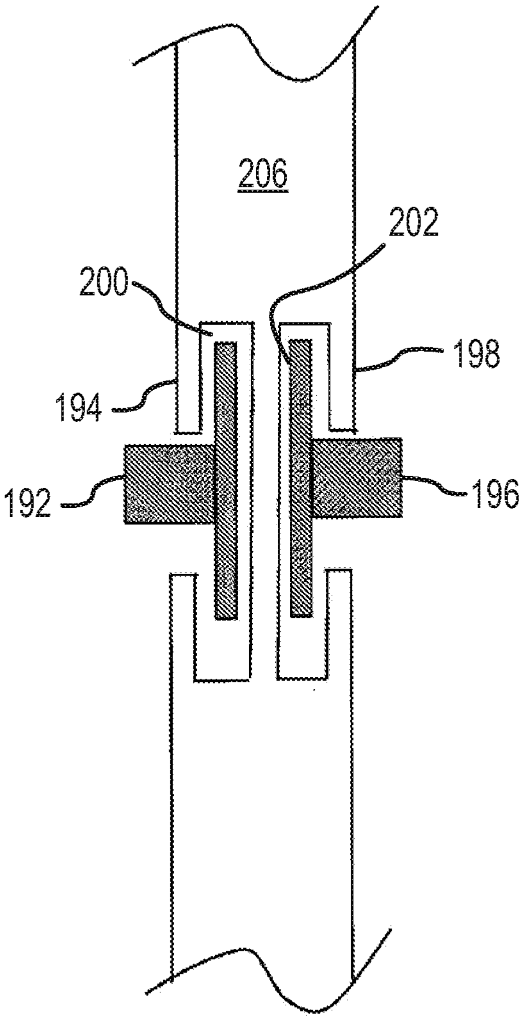
FIG. 5 depicts still another embodiment in the shape of magnetically mated switches.

FIG. 5 depicts a cross-sectional, schematic side view of a waterproof and/or air-tight switch 190 employing magnetic surfaces. Such switches may be useful for devices where water and/or gases should be kept out of the device interior, including computers, portable computing devices, mobile phones, portable music players, network switches, routers and the like, refrigerators and other household appliances, televisions, and so on.

As shown in the figure, an interior switch 192 is located within the internal side 194 of the device and an exterior switch 196 is located on the external device side 198, approximately across from each other and separated by a portion of the device's wall. Each switch may be partially within a cavity 200 formed to restrict motion of the switch, as is known in the art. Alternative methods of ensuring the switch moves only in the manner desired are also contemplated by this document and in alternative embodiments.

The exterior switch 196 includes a coded magnetic surface 202 on its inward-facing portion (e.g., the portion facing the interior switch). Likewise, the interior switch 192 includes a coded magnetic surface 204 on its outward facing surface (e.g., the portion facing the exterior switch). The exterior and interior coded magnetic surfaces may be programmed to resist translational decoupling from one another. Accordingly, as a user drags or moves the exterior switch from a first to a second position, the coded magnetic surfaces cooperate to slide the interior switch in the same direction. Essentially, the exterior and interior switches 192, 196 are magnetically coupled such that motion of one moves the other. In this manner, the interior switch may trigger device functionality even though it is never moved or touched by a user. Since the magnetic coupling forces between switches extend through the sidewall, the interior switch 192 and internal portion of the device may be waterproof and/or hermetically sealed.

In an alternative embodiment, the interior switch may be replaced by a sensor that reads the motion of the maxels on the exterior switch and controls operation of a device accordingly. Thus, as the exterior switch slides, the interior sensor detects the motion and instructs the device to activate, deactivate or provide other functionality (such as controlling audio volume), as appropriate. In this manner, the switch may have no moving internal parts at all. Further, appropriately configuring the external coded magnet may permit the internal switch to detect both the type and distance of any movement.

Other input devices may also be created through the application of coded magnetics. For example, and similar to the embodiment shown in FIG. 5, an external button and internal button may have opposing coded magnetic surfaces. In this case, the surfaces may be repulsive rather than attractive. A spring or other resistive element may bias the internal button forward against the device sidewall; a second spring or resistive element may bias the external button outward.

As a user pushes the external button against the spring, the repulsive magnetic force may likewise push the internal button downward, into the device exterior. After traveling a sufficient distance, the internal button may close a contact, open a contact, or otherwise initiate or terminate some device functionality. A detent or locking mechanism may hold the exterior button in place until a user depresses it or otherwise interacts with the button. The repulsive magnetic force may be sufficient to hold the interior button in place when the external button is stationary. As the external button is depressed, the interior button may rise and terminate device functionality.

It should be appreciated that the programmable force curve that may be achieved with correlated magnets make such a button arrangement feasible, as the force curve may be simultaneously programmed to attract the internal and external buttons to one another when they have too great a separation distance but repulse the buttons from one another when the separation distance grows too small.

Bearings and Motors

Correlated magnets, and the programmable force curves associated with them in particular, may also be used to tune bearings and motors within an electronic device, machinery or other system. If the maxels are electromagnetic, the correlated magnet may provide dynamic tuning capabilities. Certain examples follow.

In mechanically and electrically complex systems, such as a laptop computer or other portable computing device, different system components can interfere with each others' operation. As one example, a moving element such as a fan near another element, like a hard drive, may create a harmonic frequency that disrupts the drive's operation. This is but a single example for purposes of illustration. If feedback from the hard drive (or other element) indicates excessive motion then the fan may be damped by means of an associated, dynamically programmed correlated magnet. The correlated magnet may, for example, repulse the fan or a portion of the fan to change its motion and thus the generated interference. The magnet may likewise attract the fan or a portion thereof. For purposes of attraction and repulsion, certain embodiments may place a second, appropriately coded correlated magnet on a portion of the fan. Further, by dynamically adjusting the polarity of individual maxels, the attractive or repulsive strength of the correlated magnet(s) may be changed on the fly to provide customized damping.

Feedback regarding the hard drive's motion may be gathered from any appropriate sensor, such as a gyroscope or accelerometer. It should be appreciated that the fan and hard drive are used solely to illustrate the principle of dynamic system damping using programmable correlated magnets, and particularly programmable correlated magnets with electromagnetic maxels.

Coded magnets may also be used in a brushless DC motor in order to increase control of angular momentum. Coded magnets may be used, for example, to provide position control to a motor (via the adjustable force curve) without requiring a separate angle encoder for the motor.

Still another example of this will be provided with respect to fans inside a computer case. During shipping, installation and/or assembly, fans may be damaged or pushed off-center such that their rotation becomes erratic and noisy. A programmable correlated magnet may be used to "push" or "pull" the fan back into alignment. Fans may be provided with magnetic bearings to facilitate this operation.

As still another example, coded magnets may be used to buffer a hard drive from a sudden, sharp drop or fall. An accelerometer may detect abrupt motion of the hard drive in a specific direction. If this motion exceeds a threshold, a coded magnet may be activated to push the hard drive away from its enclosure. Given a sufficiently strong repulsive force, the hard drive may be prevented from impacting the enclosure or anything else, thereby reducing the likelihood of damage to data resulting from a dropped or falling laptop.

Further, coded magnets may be used to change the acoustic properties of fans operating in a computer housing, or the acoustic properties of any motorized device. An appropriately coded magnet may intermittently adjust the rotational speed of a fan, thereby preventing the fan from emitting a beat frequency. Further, the coded magnet may adjust the fan speed in such a manner that the fan produces white noise or a noise masking the operation of other components. A microphone may be used as a sensor to determine the fan noise or noise of another component. A microprocessor may use the microphone's output to dynamically adjust the polarity of the coded magnet's maxels to impact the fan's operation as described above.

Assembly of Devices

It should be appreciated that the precise alignment and "homing" that may be achieved with appropriately configured pairs of correlated magnetic surfaces may provide useful functionality for precision assembly of devices. As one example, a laptop computer generally has precise tolerances and positions for all its constituent elements within the laptop chassis. If one element is misplaced, the laptop may not function properly or may not pass a final assembly inspection.

Continuing this example, each element to be placed within a laptop computer may have a coded magnetic surface with a unique magnetic code. A certain position within the laptop chassis may have the complementary or attracting coded magnetic surface. Thus, when the element is near that position, it may self-align at the position. Further, such alignment is not necessarily limited to lateral motion but may include rotational alignment as well. This precision alignment may facilitate construction or assembly of fault-intolerant devices.

Another embodiment may take the form of an assembly tool with a coded magnetic surface that dynamically changes as assembly of a device proceeds, such that the tool mates with the next element to be placed in the assembly process. For a simplified example, consider a screwdriver sized to accept multiple screws of different lengths, head sizes and the like. As assembly of a device proceeds, the screwdriver may receive a command from a computing device overseeing the assembly process to dynamically change the coding of a correlated magnet on the screwdriver tip. An operator may lower the screwdriver into a container of screws and attract to the tool only the screw that has an attractive coded magnetic surface. Thus, the screwdriver may attract only the proper screw for the next assembly step.

This same concept may be applied to automated assembly lines. Essentially, if the assembly tool (such as a robotic arm) can receive feedback regarding the current state of the assembly process, it may dynamically reprogram its correlated magnetic surface to pick up the next piece for placement and put it in the proper area, according to the foregoing disclosure.

Certain embodiments may take the form of a magnetic "rivet" or fastener. The rivet may include multiple splines that are magnetically locked to the rivet body in a withdrawn position. When the rivet is inserted into or through a material, the insertion tool may dynamically deactivate the electromagnetic magnets holding the splines to the body. The splines may thus extend outward behind the material in a fashion similar to an anchor bolt. In alternative embodiments, the tool used to place the rivet may have a coded magnetic surface that attracts the splines to the tool, thereby keeping them flush against the barrel. When the tool is removed, the splines extend. In this embodiment, the magnetic rivet may have a bore into which the tool may fit in order to draw the splines inward against the rivet body.

In addition to assembling devices through the use of coded magnetic surfaces, devices held together by such surfaces may be relatively easily disassembled. Degaussing the device may wipe the coded magnetic surfaces, causing them to no longer attract one another. Thus, at least certain portion of the device may easily separate from one another for breakdown, recycling and the like.

Data Encoding

General concepts of encoded, matching elements facilitated by coded magnetic surfaces were discussed above in the section labeled "Cables." The concepts set forth therein, including dynamic matching of two devices and dynamic reprogramming of one or more coded magnets may be applied to a wide variety of electronic devices.

Still another example of data encoding that may be accomplished through coded magnets with electromagnetic maxels is a "challenge and reply" authentication scheme. For example, a key may be inserted into a lock, a cable into a port, or two devices may sit side by side. In any of the foregoing, both the key and lock/cable and port/first and second device may have a coded magnet surface adjacent one another. One of these two coded magnetic surfaces may be controlled by a microprocessor to rapidly change the polarity of certain maxels in a specific pattern. The other coded magnetic surface may be programmed to change its' maxels' polarity to generate the complement of the first surface's changing pattern. Thus, as both coded magnetic surfaces change with time, they remain magnetically attracted to one another and their corresponding elements coupled to one another. Should either coded magnetic surface fail to change according to the determined pattern, the associated elements may be magnetically repulsed from one another. This may have consequences ranging from ejecting cable from a port, to moving a key out of a lock, to terminating data communication between two computing devices.

In another embodiment, a key may have a coded magnetic surface. The key may be inserted into a lock. Instead of mechanically moving tumblers within the lock, the key may attract or repulse tumblers via the coded magnetic surface. Accordingly, only a key with the proper coded magnetic surface may move the tumblers into the proper position to open the lock. Both polarity and intensity of any given may facilitate moving a tumbler into the proper position. In such embodiments, it should be noted that both the key surface and the lock may be smooth, since mechanical interaction between the key and tumblers is not required. Further, the tumblers may be placed behind a sidewall made from plastic or another material that does not interfere with magnetic fields, thus reducing the likelihood that the lock may be picked.

Similar principles may be used to identify two devices to one another through dynamically programmable coded magnets. The changes in the coded magnet's field may correspond to an identification sequence for a particular device. Further, devices equipped with magnetic sensors may detect other devices with coded magnetic surfaces. The magnetic surface may be coded to act as a device identifier when static; the resulting magnetic field may be unique and detectable by nearby devices. Thus, a device sufficiently near another device to detect the magnetic fields of the adjacent device's coded magnetic surface may read this data as a serial number or other identifier for the adjacent device.

Yet another embodiment may employ matching coded magnetic surfaces to transmit data. The electromagnetic maxels may vary their polarities to transmit data to a magnetically sensitive sensor. Essentially, since the maxels may be programmed and are binary in nature (e.g., either showing a north or south pole, depending on current), each maxel may transmit binary sequences to an appropriately-configured sensor. Likewise, multiple maxels adjacent one another may cooperate to transmit longer binary codes simultaneously. If the maxels of a correlated magnetic surface are used for such a purpose, it may be desirable to have fixed magnets with a higher magnetic flux than that of the maxels to ensure the cable stays mated to the port (or the two devices to one another, and so forth). A mechanical mating may be used in certain embodiments.

Latches

Certain embodiments may also take the form of a latch or closing mechanism for an electronic device, box or other item that may be opened and closed. One example of such a device is a laptop computer. A first correlated magnet may be placed at a lip or edge of a device enclosure, typically in a position abutting the top or lid of the device when the device is in a closed position. A second magnet may be located in the lid and generally adjacent the first correlated magnet when the device is closed. The first and second correlated magnets may be coded to attract one another when the separation distance is below a threshold and repulse one another when the separation distance exceeds the threshold. Thus, the correlated magnets may assist in opening or closing the device, depending on the separation distance. The magnets may have sufficient attractive force below the separation threshold to automatically pull the device closed in certain embodiments.

Another embodiment may place multiple coded magnets in the clutch (e.g., hinge) of a laptop computer or similar device. One coded magnet may be in the portion of the clutch engaged with the base of the laptop and one on the clutch portion engaged with the top of the laptop. The magnets may be coded to rotationally repulse one another until a certain rotational alignment is achieved, at which point the magnets may be coded to attract one another. In this fashion, the circular coded magnets may act as a detent to hold the device top open in a particular position with respect to the device base. The coded magnets may have multiple such virtual detents to permit a user a range of options for opening and/or closing the device.

Ferrofluids

Various embodiments may employ coded magnets with ferrofluids to achieve a variety of effects. Ferrofluids are generally liquids that become strongly polarized in the presence of a magnetic field. Ferrofluids may thus be attracted and repulsed by magnetic fields.

Certain embodiments may employ coded magnets to attract or repulse ferrofluids to place ferrofluids in a particular place at a particular time. As one example, a coded magnet may be activated when a proximity sensor detects a finger approaching a touchpad or other surface capable of detecting a touch. (The exact mechanics of how the surface detects the touch are irrelevant; the present disclosure is intended to encompass capacitive sensing, IR sensing, resistive sensing and so on.) As the finger (or other object) approaches the surface, the proximity sensor's output may activate a coded magnet beneath the portion of the surface about to be impacted. This coded magnet may draw ferrofluid to it, resulting in an upper portion of the surface rising or bulging. In this manner, the touch-sensitive surface may provide visual and/or haptic feedback indicating the touch has been sensed. Haptic feedback may be achieved because the feel of touching the ferrofluid-filled bulge would be different than touching the flat touch-sensitive surface. Further, it should be appreciated that the sensing algorithms and/or capabilities of the surface may be adjusted to account for the pool of ferrofluid.

Yet another embodiment may apply the foregoing principles to a touch-sensitive keyboard with a flat surface. Keys may be inflated by attracting ferrofluid to the appropriate key just before or as the key is touched. In such an embodiment, a maxel may be located beneath each key with the maxels beneath all keys (and, possibly, other areas of the keyboard) forming the coded magnet. It should be appreciated that the coded magnet underlying the keyboard may be dynamically programmed to direct ferrofluid where necessary and repulse ferrofluid from other areas. Thus, upon sensing an imminent touch, the polarities of more maxels than merely the one underlying the key to be touched may change. As one example, the maxels may change polarities in order to drive ferrofluid beneath the key in question, then changed again to drive ferrofluid out from beneath any key other than the one about to be touched.

Insofar as ferrofluids are generally opaque, certain embodiments may employ coded magnets to attract or repulse ferrofluids beneath or within an input or output device to alter the translucence of the device. For example, a certain amount of ferrofluid may be drawn beneath a transparent surface with a backlight. The ferrofluid may be repulsed from a particular point beneath that surface but maintained in all other areas, thereby creating a lighter point on the surface to indicate where a user should touch or interact with the device.

Yet another embodiment may employ correlated magnets and a ferrofluid as elements of a cooling system. Liquid cooling systems are commonly employed in electronic devices to remove heat from certain elements, such as processors. Ferrofluids are used in certain thermal cooling systems; as a ferrofluid is heated, its magnetic qualities decrease (e.g., it becomes less attracted to a magnet). Thus, a magnet near an element to be cooled will attract ferrofluid which will be heated by the element, thereby becoming less magnetically sensitive. The heated ferrofluid will flow away from the magnet and be replaced by cool ferrofluid. This cycle may continue indefinitely.

By using a dynamically programmable correlated magnet (e.g., one with electromagnetic maxels), the magnetic attraction and/or repulsion of ferrofluid to hot spots or elements within an electronic device may be enhanced. Thus, as certain areas or element heat up, more ferrofluid may be diverted to that area to enhance cooling.

Security

Certain embodiments discussed herein may present themselves for use in unique security applications. Some such embodiments may relate to electronic device security, while other relate to data security and still others to physical access security. Examples of each follow.

Figure 6:
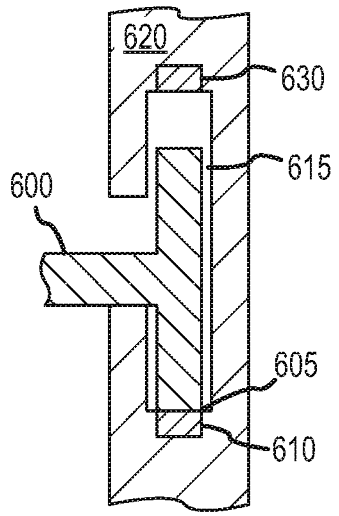
FIG. 6 depicts a sample security switch in a first position within an electronic device housing.

One embodiment may take the form of a security feature for an electronic device housing, other housing or enclosed device. A mechanical switch may be located on an interior of the housing and physically inaccessible from the housing exterior. The housing may be, for example, a magnetically-transmissible material, including most metals, polymers, plastic, organic materials and so on. One sample arrangement of such an internal switch is shown in FIG. 6, which is a side, cross-sectional view of a portion of an electronic device housing wall. Conceptually, the view of FIG. 6 is similar to that of FIG. 5.

As shown in FIG. 6, the switch 600 occupies a first position in which its lower portion 605 contacts a relay 610 set within an aperture 615 of the interior portion of the sidewall 620. The relay 610, for example, may maintain an associated electronic device in a first operational state or provide a first functionality, or lack or the foregoing. Essentially, the switch 600 may control any operation or function of an associated electronic device, including changing power states, volume, display/visual parameters and the like.

Figure 7:
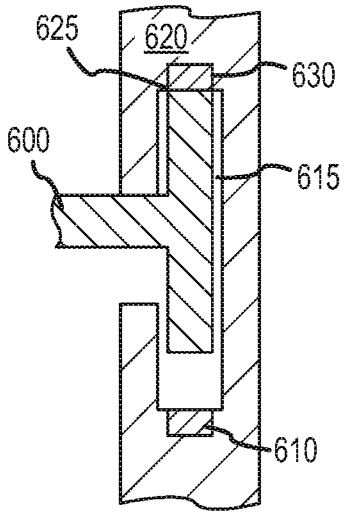
FIG. 7 depicts the sample security switch of FIG. 6 in a second position within the electronic device housing.

A second relay 630 may be set into or adjacent an upper portion of the aperture 615. When the switch contacts the second relay, the functionality of the associated electronic device may be changed. For example, the electronic device may be switched on, an application may be launched, a data file played, volume or a visual display adjusted, and so on. FIG. 7 shows the switch 600 in its second position, with the top surface of the switch 625 contacting the second relay 630.

Figure 8:
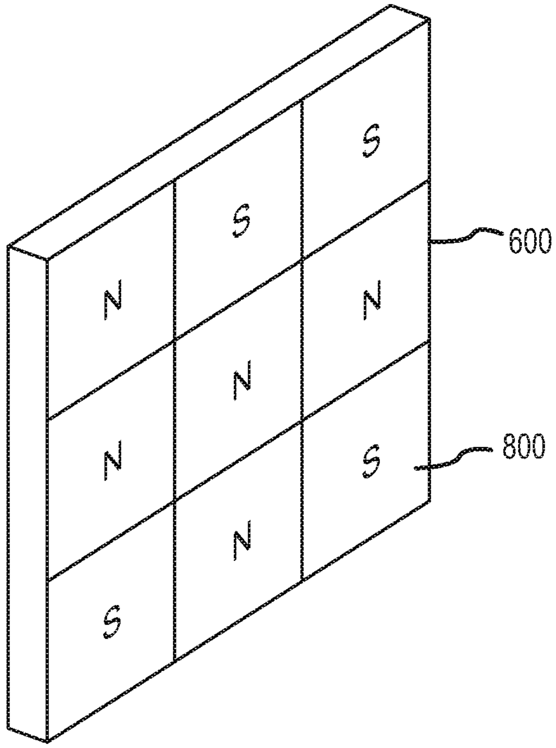
FIG. 8 depicts one possible magnetic configuration of a front surface of the switch shown in FIGS. 6 and 7.

The switch 600 may have a face that forms a particular correlated magnet structure, one example of which is shown in FIG. 8. A key (not shown) having a complementary maxel pattern may be placed adjacent the outer sidewall 620 of the enclosure, nearby the position of the switch 600 within the aperture 615. In some embodiments, the outer surface may be marked with a pattern, color or the like to indicate where the key should be initially placed. The user may slide the key along the outer surface of the enclosure 620; the magnetic force attracting the key to the switch 600 may move the switch within the aperture as the key moves. Thus, the switch is moved from the first position shown in FIG. 6 to the second position shown in FIG. 7.

Any number of structures and/or forces may be used to maintain the switch 600 in either of its positions, including mechanical detents, friction, biasing elements (e.g., springs), magnetic forces and the like. Generally, the forces responsible for maintaining the switch in either position may be weaker than the magnetic force applied by the key (or a vector of that force) in order to permit desired motion of the switch. Alternately, the forces and/or structures may retract, withdraw or otherwise be cancelled when the switch senses the presence of a correctly-coded key.

It should be appreciated that the relays may be placed in different sections of the aperture without disrupting the functionality described herein.

FIG. 8 shows one sample arrangement of maxels 800 on the front surface of a sample switch 600. It should be appreciated that any number of maxels may be used on the face of the switch, although nine are shown in FIG. 8. It should also be appreciated that one or more sides of the switch 600 may include maxels formed thereon. Although electromagnetic maxels may be used for either or both of the switch and key, permanent magnetic maxels may likewise be employed.

Not only may the number and positioning of the maxels be varied on the switch 600 (and key), but the arrangement and force also may be varied. Some embodiments may use a circular, rectangular or other geometric maxel pattern. Others may employ an irregular pattern. Generally, by varying the force curve, number of maxels, pattern and maxel strength, a practically infinite number of variations on the force curve generated by the switch may be produced. It may be desirable to create a force curve that continuously and/or smoothly attracts only a key having the proper correlated magnet therein or thereon.

If the key corresponding to the switch 600 is ever lost, a user may take the electronic device to a vendor to have a new key made and magnetically encoded. The vendor may have access to a list of all devices and the correlated magnet patterns for each device's switch, for example. Alternately, the correlated magnet pattern (and attendant force curve) may be based on some characteristic or parameter of the electronic device or component thereof, such as a serial number. The vendor therefore may have access to the coding pattern and/or kernel and program a replacement key accordingly. In some embodiments, the maxel pattern of the switch may also be reset or altered by authorized personnel.

In alternative embodiments, to enhance security, both the switch 600 and key may include electromagnetic maxels. The maxel pattern (including polarity, magnetic strength and power status) may vary with time, length of use, a periodic random number generator and so on (any of which may be a kernel for the maxel pattern). The key and switch may electromagnetically vary their maxel patterns to stay synced to one another as the kernel changes.

Figure 9:
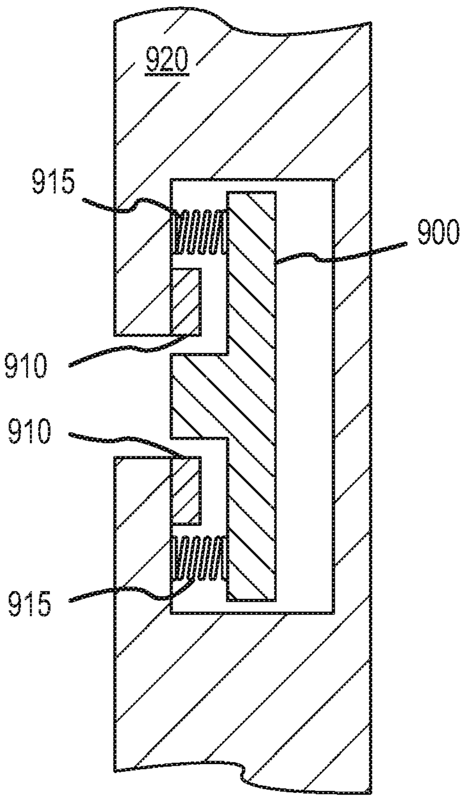
FIG. 9 depicts an alternate embodiment of a sample security switch.

It should be appreciated that certain embodiments may use switches or contacts that do not slide. For example, FIG. 9 depicts a switch 900 received in an aperture within a sidewall 920 of an electronic device housing. The switch 900 is biased away from one or more contacts 910 by one or more springs 915. When a key having the proper correlated magnet structure is moved toward the outer surface of the electronic device sidewall 920, the switch 900 may be forced backward by the resulting magnetic force. The switch may thus touch the contact(s) 910, thereby activating, deactivating or otherwise changing functionality of the associated electronic device.

In alternative embodiments, the switch 900 may be pulled forward to touch one or more contacts 910 by the appropriately-configured magnetic key, rather than being pushed backward. Further, in embodiments having a biasing force that is to be overcome by the magnetic force generated by a properly-coded correlated magnetic structure, touching the contact(s) may activate a circuit that maintains the switch's position against the contact. Alternately, the contact between the switch and contact(s) may toggle functionality, operational status and the like, so that a second contact returns the associated electronic device to its original (e.g., pre-first contact) state.

Effectively, the maxel structure of the switch acts as a digital code, permitting only the appropriately configured magnetic key to operate it. In alternative embodiments, instead of sliding, rotating, pushing or otherwise moving the key physically, a magnetometer or other magnetic field sensor may measure the field strength near the switch 600. As the properly coded key approaches the switch, the magnetic field will fluctuate. The magnetic sensor may actuate one or more of the associated electronic device's functions based on the change in the magnetic field.

Figure 10:
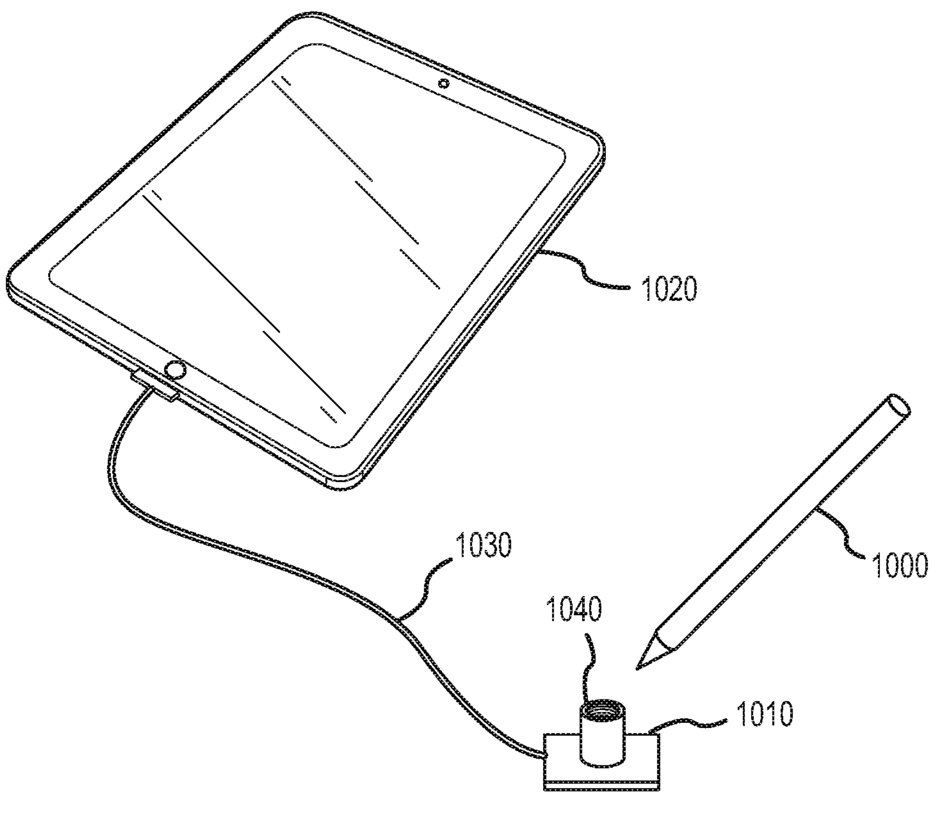
FIG. 10 shows one sample embodiment for securely connecting an input device to a computing device using correlated magnetic structures.
Figure 11:
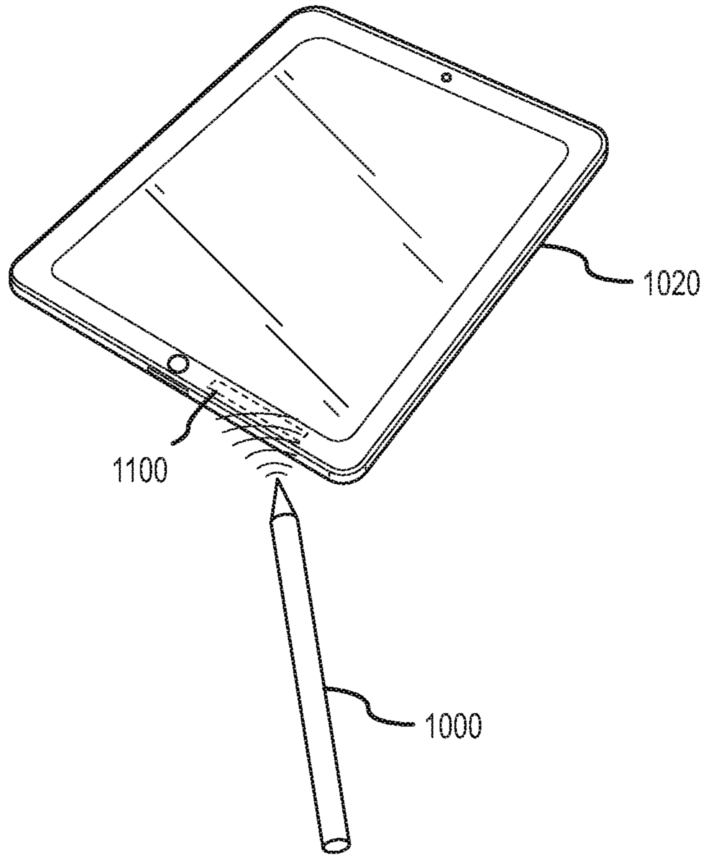
FIG. 11 shows a second sample embodiment for securely connecting an input device to a computing device using correlated magnetic structures.

FIGS. 10 and 11 illustrate other embodiments that may employ correlated magnets for purposes of data security. A stylus 1000 may have a coded magnet formed in or on a portion thereof, such as at or behind the tip of the stylus. A dock, port or other receptacle 1010 (collectively herein, a "port") also may have a correlated magnet formed in a portion thereof that interacts with the stylus 1000. For example, the inner wall of the receptacle 1040 of the port 1010 may be a correlated magnet or have a correlated magnet underlie the wall.

The port 1010 may be connect to a computing device 1020, such as a tablet device (illustrated), a laptop or desktop computer, a mobile telephone, a server and so on. The port may electronically receive data from the stylus 1000 when physically coupled to one another, as illustrated in FIG. 10. Alternately, and as discussed in more detail below, the stylus 1000 may wirelessly couple with a port incorporated into the computing device 1020, thereby removing any requirement for physical contact.

In the embodiment of FIG. 10, data received from the stylus 1000 is transmitted to the computing device 1020 across a cable 1030 or other link. In order to couple to the port 1010, the stylus 1000 generally physically contacts the receptacle. In the embodiment of FIG. 10, however, the correlated magnetic structure of the port 1010 may repulse any stylus 1000 lacking a complementary correlated magnetic pattern. Thus, only those styli previously paired or otherwise authorized with the port 1010 may be accepted for data transfer. As yet another option, the mismatch of correlated magnetic structures may be sensed but the force generated may be relatively weak. This may permit the stylus to physically dock but still prevent data transfer through the port.

In some embodiments, either the port 1010, stylus 1000 or both may have their correlated magnetic structure formed by electromagnetic maxels. In such embodiments, one or both of the correlated magnetic structures can be reprogrammed to complement the other. Thus, styli and ports may be paired dynamically.

FIG. 11 depicts a wireless implementation of the foregoing, where the correlated magnetic structure 1100 is built into the computing device 1020. Here, the change in magnetic fields may be sensed by a magnetic sensor as a properly-configured stylus approaches the correlated magnetic structure 1100 in the computing device 1020. If the magnetic field changes in a preauthorized manner or reaches a preauthorized condition, data transfer between stylus and computing device may be permitted. Such data transfer may happen wirelessly, for instance.

It should be appreciated that any peripheral may be securely paired to operate with a particular computing device in accordance with the foregoing description. Input/output devices, displays, mobile phones, other computing devices and the like may all employ correlated magnet structures to securely identify each other in order to permit data transmissions.

Still other embodiments may take the form of keys incorporating correlated magnetic structures for enhanced security. A portion of a key, such as the tip, may be formed as a pattern of maxels to create the aforementioned correlated magnetic structure. The key may, or may not, include physical projections or protrusions. In some embodiments, the tip and shaft of the key may be smooth. Smooth keys may be cylindrical, square, or rectangular in cross-section, or may have any other desired cross-sectional shape.

A lock may be designed to operate with a correlated magnetic key. The interior of the lock may include a correlated magnetic structure that interacts with the correlated magnetic structure of the key. For example, when an appropriately-configured key is inserted into the proper lock, the maxels of the key may attract and/or repulse certain maxels within the lock, thereby physically moving portions of the lock. This may magnetically simulate the manner in which the physical protrusions of a key interact with tumblers in a standard lock to grant access.

It should be appreciated that a correlated magnetic lock may operate with multiple correlated magnetic keys, even if those keys have different correlated magnetic structures (e.g., different maxel patterns, strengths and the like). The lock may be set up to provide differing levels of access, depending on which key is used with the lock. As one example, a first key may open only one drawer when placed into a correlated magnetic lock, while a second key with a different correlated magnetic structure may open multiple or different drawers by manipulating the maxels of the lock in a second fashion.

Keys (and locks) designed according to the principles described herein may be indistinguishable from one another, since interaction between key and lock does not necessarily depend on the physical properties of the key. Thus, keys may be made to look alike in order to further enhance security. The correlated magnetic structures discussed herein may be used in conjunction with physical aspects of a key, such as protrusions and depressions, if useful or desired.

It should likewise be appreciated that a lock having a correlated magnetic structure may place the maxels and any associated moving parts behind a barrier within the lock. That is, because the maxels are magnetically manipulated, they need not come into physical contact with a key having a proper correlated magnetic structure. Thus, a correlated magnetic lock may be more difficult to pick or open in an unauthorized fashion, as the tumblers/maxels/physical elements may not be directly manipulable.

Other Embodiments

Various other embodiments may use correlated magnets to achieve a variety of effects and implement certain features. As one example, an electronic device (e.g., a laptop, audio/video receiver, other computer, portable computing device, television, monitor and the like) may employ correlated magnets to provide active valving for thermal management. Many electronic devices have dedicated airflow paths to move air masses to and/or through particular areas for cooling. Typically, these paths are static and passive—they direct however much airflow is provided to them and cannot change the flow paths.

In one embodiment, coded magnets may be used to open or close louvers in the airflow paths, thus shutting off and/or redirecting air within the electronic device enclosure. The coded magnets may be electromagnetically programmed to open and/or close louvers as necessary to route air from a fan to a particular portion of the device enclosure. For example, the outputs of various thermal sensors may be used to determine where more airflow is necessary to cool a hot internal element or area, and the coded magnets may be reprogrammed on the fly to attract and/or repulse the louvers to direct the airflow accordingly. In some embodiments, the airflow ducts, louvers and magnets may be formed in a separate layer so that the louvers may move freely without impacting other internal components.

As still another option, the foregoing may be applied to magnetically lower louvers across exhaust and/or air intake ports when no or minimal cooling is needed. Likewise, the louvers may be magnetically raised by the electromagnetic coded magnets when air intake and/or exhaust is desired. Further, because the coded magnets may be electromagnetically reprogrammed in real-time, the distance to which the louvers open (and thus the amount of air let in or exhausted) may likewise be controlled.

Still another embodiment may employ correlated magnets to cool electronic components within an enclosure via the magnetocaloric effect. The coded magnet may control this effect and/or act as a heat pump to shift heat through the enclosure as necessary. The magnetocaloric effect generally employs a changing magnetic field in certain alloys to decrease the surface temperature of that alloy, as known in the art.

Still another embodiment may employ correlated magnets to track the motion of a stylus on a screen, trackpad or other surface. The stylus may have a magnetic sensor located thereon that may detect the unique magnetic fields produced by coded magnets. By placing a number of coded magnets beneath the surface, the stylus may read the unique magnetic field of each coded magnet and thereby know its relative position on the surface. The stylus may relay this information to an associated electronic device to permit the device to know the stylus' location. Such information may be transmitted wirelessly or over a wired connection.

Alternately, the surface may have a number of magnetic sensors located beneath it and the stylus may have a unique magnetic signature generated by a coded magnet located on the stylus (for example, at the tip of the stylus). The magnetic sensors may thus track the motion of the stylus and sense its location relative to the surface.

Coded magnets may also be used as speaker actuators and provide additional speaker control. For example, if the speaker actuator is a coded magnet, it may also function as a sensor to determine the position of the speaker driver. This data may be used as part of a feedback control loop to improve accuracy of the driver.

Yet another embodiment may incorporate correlated magnets to detect when a lithium-ion polymer battery swells. As these types of batteries age and are used, they may thicken and/or warp. In electronic device enclosures with strict tolerances, this may lead to a risk of fire if the internals of the battery are punctured due to battery motion, thickening, warping and so on. A correlated magnet pair (one on the battery and one nearby) may be used to sense the position of the battery. The correlated magnet not on the battery may detect a change in the magnetic field strength and/or polarity as the battery swells and the correlated magnet thereon moves accordingly. If this change is sensed, the electronic device may disable the battery. As yet another option, as the field strength of the correlated magnet increases, it may flip a magnetic switch that disables the battery.

Generally, embodiments discussed herein have presumed that the maxel array of the coded magnet has the maxels positioned at uniform distances from one another, or adjacent to one another. It should be appreciated that the force curve of a coded magnet may be adjusted by changing the spacing of individual maxels as well as changing the polarity and/or magnetic strength of the maxels. Certain embodiments may even employ maxels that may be shifted in one or more dimensions to dynamically adjust the aforementioned force curve to achieve a variety of effects, including those listed herein.

Electronic devices may employ correlated magnets to enable and disable power buttons. Many users accidentally press the power buttons of their electronic devices when using them, which may lead to a loss of data or interruption of use when the device is on. This may be avoided through the use of at least one correlated magnet.

As an example, presume an electromagnetic correlated magnet is located beneath a metal or magnetic power button. The correlated magnet may be off until the device is turned on via the button, at which point the electromagnetic maxels of the correlated magnet are activated. At this point, the correlated magnet may repulse the power button and thus prevent it from being pushed in, which in turn prevents the user from accidentally powering down the device. The correlated magnet may stay powered on until a certain condition is met. One example of such a condition is that the user ceases to interact with the device in any fashion for a minimum time. Another is that the device fails to provide any output for a minimum time.

Regardless, once the condition is met, the correlated magnet may be depowered, thereby permitting the user to depress the power button and turn off the device.

Magnetic ID Tags

Certain embodiments may employ coded magnets as identification tags. Devices with appropriately configured magnetic sensors (and/or coded magnets of their own, which may function as magnetic sensors) may detect the magnetic field of a nearby coded magnet. This magnetic field may act as a "signature" to identify the coded magnet and an object associated with it. Thus, the coded magnet may function as a sort of close-proximity identification chip, but without requiring any active broadcast or mechanical connection.

As one example, a museum may include multiple coded magnets at or near each exhibit; each coded magnet may generate a unique magnetic field. As a visitor approaches the exhibit, the user's electronic device may detect the magnetic field and compare it to a master database downloaded onto the device upon entering the museum. The device may match the magnetic field to an entry in the database and retrieve information from the database associated with the field. The electronic device may display this information to the visitor, thus allowing him or her to appreciate the exhibit without requiring him or her to dock the device to a connector or receive any broadcast. This process may be applied in other venues, as well.

Keys and access cards may likewise incorporate coded magnets to permit or deny entry. A user's access card may have a unique magnetic signature that may be recognized by a card reader, which may allow or deny entry based on that signature.

Although this document lists several concepts, methods, systems and apparatuses using correlated magnets, it should be appreciated by those of ordinary skill in the art that the contents of this document may be readily adapted to various other embodiments without requiring any inventive step. Accordingly, the concepts, methods, systems, apparatuses and the like discussed herein are provided by way of illustration and not limitation.

We claim:

1. A magnetically-implemented security device, comprising:
- a first correlated magnet formed on a first structure, the first correlated magnet comprising at least two unique magnetic surfaces;
- a biasing member connected to the first structure, the biasing member exerting a biasing force against the first structure; and
- a second correlated magnet formed on a second structure; the second correlated magnet authenticating the second structure with the first structure; wherein
- a magnetic force of the second correlated magnet overcomes the biasing force when the second correlated magnet is in communication with the first correlated magnet to unlock the security device.

2. The magnetically-implemented security device of claim 1, wherein:
- the first structure is a switch at least partially enclosed by a sidewall of an electronic device; and
- the second structure is a key external to the electronic device.

3. The device of claim 2, wherein the key is operative to magnetically move the switch from a first position to a second position, thereby altering functionality of the electronic device.

4. The device of claim 3, wherein the key is operative to push the switch against a contact.

5. The device of claim 2, wherein the at least two unique magnetic surfaces comprise a plurality of electromagnetic surfaces.

6. The device of claim 1, wherein the plurality of electromagnetic surfaces may be dynamically adjusted to provide a unique magnetic force curve, said unique magnetic force curve operable to interact with the key.

7. A method for securely accessing functionality of an electronic device, comprising:
- magnetically coupling a key to a magnetic surface of an interior element of the electronic device, the magnetic surface comprising a plurality of sub-regions, each of the plurality of sub-regions having its own magnetic characteristics;
- moving the key;
- in response to moving the key, magnetically manipulating the interior element; and
- in response to magnetically manipulating the interior element, activating the functionality; wherein
- the functionality is an electronic operation of the electronic device.

8. The method of claim 7, wherein the interior element is physically inaccessible from an exterior of the electronic device.

9. The method of claim 8, wherein magnetically manipulating the interior element comprises forming an electrical contact between the interior element and an interior contact.

10. The method of claim 8, wherein the operation of manipulating the interior element comprises:
- applying magnetic force to the interior element via a magnetic pattern formed on the key, the magnetic pattern formed on the key complementary to the magnetic surface of the interior element; wherein
- the magnetic force is sufficient to overcome a biasing force acting on the interior element.

11. The method of claim 10, wherein the magnetic pattern formed on the key and the magnetic surface of the interior element each change according to a non-magnetic parameter.

12. The method of claim 11, wherein the non-magnetic parameter is associated with the electronic device.

13. The method of claim 10, wherein each of the sub-regions of the magnetic surface may vary in intensity of magnetic force, as well as polarity.

14. The method of claim 7, wherein the functionality comprises at least one of activating the electronic device, varying an audio output, varying a visual output, or launching an application.

15. An apparatus for securely transmitting data to a computing device, comprising:
- a data receiver operable to receive data from a peripheral;
- a data transmitter operably connected to the data receiver and operable to transmit the data to the computing device;
- a magnetic structure associated with the data receiver, the magnetic structure operable to prevent the data receiver from receiving data unless the peripheral has a complementary magnetic structure.

16. The apparatus of claim 15, wherein the magnetic structure comprises a plurality of individual magnets, each of the individual magnets separately cooperating to produce a combined force profile.

17. The apparatus of claim 16, wherein the combined force profile attracts the complementary magnetic structure of the peripheral.

18. The apparatus of claim 16, wherein each of the individual magnets may be electrically varied in at least one of polarity and strength.

19. The apparatus of claim 18, wherein the apparatus is operative to pair with the peripheral by varying its magnetic structure.

20. The apparatus of claim 15, wherein:
- the data receiver is incorporated into the computing device;
- the data transmitter is incorporated into the peripheral; and
- the data transmitter is wirelessly connected to the data receiver.

21. The apparatus of claim 20, wherein the peripheral is a stylus.

* * * * *